Nov. 5, 1929.  F. W. McDONELL  1,734,178

ELECTRICAL CONDENSER

Filed Jan. 21, 1926

Frank W. McDonell
INVENTOR

BY W. B. Whitney
ATTORNEY

Patented Nov. 5, 1929

1,734,178

UNITED STATES PATENT OFFICE

FRANK W. McDONELL, OF BROOKLYN, NEW YORK, ASSIGNOR TO ALUMINUM SCREW MACHINE PRODUCTS COMPANY, OF EDGEWATER, NEW JERSEY, A CORPORATION OF NEW JERSEY

ELECTRICAL CONDENSER

Application filed January 21, 1926. Serial No. 82,655.

This invention relates to variable electrical condensers, and particularly to a condenser of the type used in radio receiving apparatus for selectively controlling the frequency of resonance of its tuned electrical circuit.

The variable condenser is a most important factor in the successful operation of a radio receiver. In many receivers it is highly essential that the variable condenser maintain its original electrical characteristics, so that its total electrical capacity, and the variation of its electrical capacity as a function of the movement of the control dial or knob, be always the same. To meet this requirement, the condensers, as at present constructed, are assembled from parts which are fabricated with the greatest possible accuracy from carefully prepared designs, and, for such adjustments as may be necessary, the services of skilled workmen are required. Consequently, the cost of production, and the selling price, of these condensers is relatively high.

The object of my present invention is primarily to reduce the cost of production, and to this end my improved condenser comprises, as one of its features, a mounting for the stator group of plates upon the frame of the condenser by means of which these plates may be readily adjusted, by rotation about one or both of two axes perpendicular to each other, to a position in parallelism with the plates of the rotor group, and, as a further feature, a special shaft for the rotor group of plates with novel adjustable bearings whereby end play is eliminated and sufficient friction to hold the shaft in any angular position to which it may be moved may be obtained without interfering with the smooth working of the bearings.

The new condenser is well adapted for quantity production, since the several parts thereof need not be made as accurately as heretofore, but may vary in either direction within the wide tolerances, and as or when assembled may be suitably adjusted by a less skilled class of workmen and hence at low cost.

One practical embodiment of the invention is shown, by way of illustration and not of limitation, in the accompanying drawings, in which—

Figure 1:
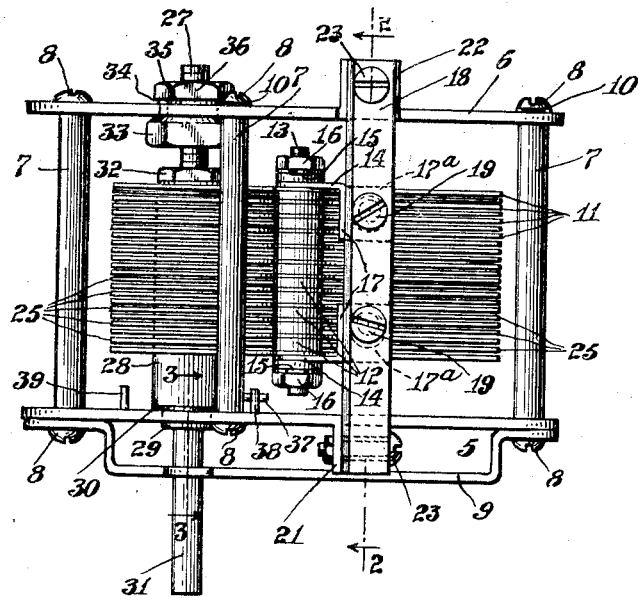
Figure 2:
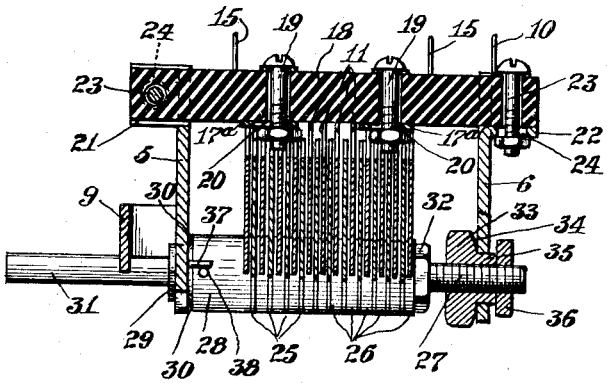
Figure 3:
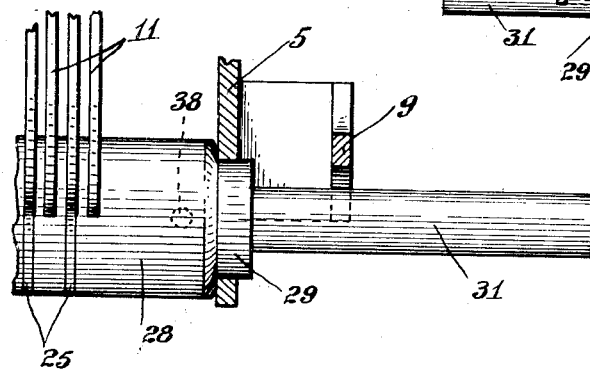

Figure 1 is a front or plan view of the complete condenser; Fig. 2 is a sectional view thereof on the line 2 2 of Fig. 1, with one frame plate broken back to show the bearing in section; and Fig. 3 is a detail in section on the line 3 3 of Fig. 1.

The frame of the condenser comprises front and rear plates 5 and 6, more or less triangular in shape, and three posts 7 to the opposite ends of which the plates are secured by screws 8. To the face of the front plate there is secured, by the screws fastening the plate to the two bottom posts, a narrow offset plate 9 provided with threaded holes (not shown) by which the condenser is, or may be secured to a panel. Perforated ears 10, for the attachment of the circuit wires, are attached to the back of the rear plate by the same screws which secure this plate to the ends of two of the posts.

The plates 11 of the stator group are assembled, spaced apart by washers 12, on a rod 13 and are held in place thereon, between two attachment members 14 and perforated terminal ears 15, by nuts 16 on the threaded ends of the rod. The attachment members are shaped, as shown, to provide backs 17 and seats 17$^a$ for a bar 18, of hard rubber or other insulating material, to which they are adjustably attached by screw bolts 19 passing through openings therein and somewhat larger openings 20 in the seat portions of the attachment members. The bar 18, and with it the entire stator plate assembly, is in turn adjustably attached to the frame of the condenser, at one end to the side of a vertically disposed lug 21 struck out from one of the side plates and at the other end to the top of a horizontally disposed lug 22 struck out from the other side plate, by screw bolts 23 passing through somewhat enlarged openings 24 in the lugs.

The shaft, upon which the rotor group of plates 25 and spacing washers 26 are mounted, is threaded at its rear end 27 and at its forward end has an enlarged section 28 which at its outer end is reduced somewhat to provide a bearing 29 journaled in the front frame plate and with a slightly rounded or convex shoulder 30 frictionally engaging the inner face of the plate, and also carries an extension 31 adapted to project through the panel upon which the condenser is mounted for operative connection with a control dial. The rotor plates and washers are secured in place upon the shaft between the shoulder formed at the inner end of its enlarged section and a nut 32 upon its threaded end. A second nut 33, which is threaded upon the shaft outside the retaining nut and hence is adjustable towards and from the bearing on the forward end of the shaft, is provided on its outer face with a slightly rounded shoulder 34 and a bearing 35, similar to the bearing 29 and similarly journaled in the rear frame plate. This bearing nut is locked in position on the shaft by a locking nut 36. A pin 37 which is set into the enlarged portion of the shaft serves, in connection with pins 38 and 39 set into the front plate on either side thereof, to limit the angular movement of the shaft.

All of the parts of the condenser except the bar 18, which as stated is of suitable insulating material, are or may be made of a metal, preferably aluminum, which is a conductor of electricity.

The relatively large bearings of the shaft assure their smooth working, and by turning the bearing nut, in one direction to bring the two bearings nearer together and in the other direction to move them apart, the rounded shoulders may be made to engage the inner faces of the frame plates with just the friction required to hold the shaft in any angular position to which it may be rocked, and when so adjusted is securely locked in place. The rotor element having thus been adjustably positioned, the plates of the stator group are brought into parallelism with the rotor plates by moving the bar on which they are mounted slightly, up or down at one end and forward or back at the other end as required, and then tightening the screw bolts 23 to secure the bar in position. For this purpose the bolts need be tightened merely enough to firmly seat the bar at one edge of the lugs on the frame plates in case the lugs do not exactly parallel the sides of the bar in its adjusted position. The further tightening of the bolts will extend the area of such seat by slightly springing the lugs. These plates are also adjustable upon the bar, if necessary to center them between the rotor plates, by means of the screw bolts 19. Thus, by the simple means provided, all of the necessary adjustments can be easily and accurately made.

It is to be understood that the invention may be modified in its several details, within the scope of the appended claims, without departing from the spirit or sacrificing the substantial advantages thereof.

What I claim as new, and desire to secure by Letters Patent, is—

1. An electrical condenser comprising two fixed frame plates and stator and rotor groups of condenser plates in which the stator group of plates is secured to each frame plate at a single point by means permitting the adjustment thereof with reference to the rotor group of plates about two axes parallel to the plane of the frame plates and perpendicular to each other.

2. An electrical condenser comprising two spaced frame plates carrying between them stator and rotor groups of condenser plates in which the stator group of plates is supported upon a transverse bar and is adjustable longitudinally thereof and the bar is supported at its end on the frame plates and is adjustable in a vertical plane upon one and in a horizontal plane upon the other of said plates.

3. An electrical condenser comprising two frame plates fixed in parallel spaced relationship and carrying between them stator and rotor groups of condenser plates, all of metal, in which the stator group of plates is supported upon a transverse bar of insulating material adjustably secured at its ends to a vertically disposed ear on one and to a horizontally disposed ear on the other of the two frame plates.

4. An electrical condenser comprising two spaced frame plates carrying between them stator and rotor groups of condenser plates in which the shaft of the rotor group of plates is provided with bearings journaled directly in openings in the two frame plates and with shoulders one at least adjustable to and from the other, frictionally engaging the sides of the two frame plates.

5. An electrical condenser comprising two frame plates fixed in spaced parallel relationship, a stator group of condenser plates supported upon and between the frame plates, and a rotor group of condenser plates carried upon a shaft journaled in openings in the frame plates by bearings provided with shoulders frictionally engaging the inner faces of the frame plates, one of said bearings and shoulders being carried by a bearing nut threaded upon and adjustable axially of the shaft to thereby regulate the pressure of the shoulders against the frame plates.

6. An electrical condenser comprising spaced frame plates and stator and rotor groups of condenser plates all of which are of a metal, as aluminum, the stator group of condenser plates being adjustably supported longitudinally thereof upon a bar of insulating material which at its ends is secured to the frame plates and is adjustable thereon at one end in a horizontal and at the other end in a vertical plane and the stator group
of plates being carried upon a shaft with bearings which are journaled in the frame plates
and provide an adjustable frictional engagement with the inner faces thereof.

FRANK W. McDONELL.